(12) United States Patent
Kowalewski et al.

(10) Patent No.: US 7,269,150 B2
(45) Date of Patent: Sep. 11, 2007

(54) METHOD FOR TRANSMITTING SIGNALING

(75) Inventors: Frank Kowalewski, Salzgitter (DE);
Siegfried Baer, Pforzheim (DE);
Thomas Gottschalk, Braunschweig (DE); Hyung-Nam Choi, Hamburg (DE)

(73) Assignee: Robert Bosch GmbH, Stuttgart (DE)

( * ) Notice: Subject to any disclaimer, the term of this patent is extended or adjusted under 35 U.S.C. 154(b) by 943 days.

(21) Appl. No.: 09/979,959

(22) PCT Filed: Mar. 16, 2001

(86) PCT No.: PCT/DE01/01020

§ 371 (c)(1),
(2), (4) Date: May 13, 2002

(87) PCT Pub. No.: WO01/74106

PCT Pub. Date: Oct. 4, 2001

(65) Prior Publication Data

US 2002/0154676 A1     Oct. 24, 2002

(30) Foreign Application Priority Data

Mar. 28, 2000  (DE) ................................ 100 15 317
Aug. 30, 2000  (DE) ................................ 100 42 511

(51) Int. Cl.
*H04B 7/216* (2006.01)
(52) U.S. Cl. ........................................ 370/329; 370/335
(58) Field of Classification Search ................ 370/208,
370/330, 338, 203, 204, 210, 280, 281, 294,
370/295, 322, 329, 336, 344, 347, 436, 442,
370/447, 461, 464, 441, 209, 468, 469, 474,
370/337; 375/130, 206; 455/63, 525, 38.1,
455/517, 426
See application file for complete search history.

(56) References Cited

U.S. PATENT DOCUMENTS

| 6,163,524 | A | * | 12/2000 | Magnusson et al. ........ 370/208 |
| 6,163,533 | A | * | 12/2000 | Esmailzadeh et al. ...... 370/342 |
| 6,259,724 | B1 | * | 7/2001 | Esmailzadeh ............... 375/143 |
| 6,574,211 | B2 | * | 6/2003 | Padovani et al. ........... 370/347 |

(Continued)

FOREIGN PATENT DOCUMENTS

EP     0 841 763 A     5/1998

(Continued)

OTHER PUBLICATIONS

Ghosh et al, Shared Channels for Packet Data Transmission in W-CDMA, IEEE, pp. 943-947, 1999.*

(Continued)

*Primary Examiner*—Frank Duong
(74) *Attorney, Agent, or Firm*—Michael J. Striker

(57) ABSTRACT

A method for transmitting signaling is proposed which is simple and efficient without taking up significant transmission capacity. In the method, a transmission of the signaling takes place between a mobile station (12) and a base station (11) in a mobile radio network. The signaling is transmitted in at least one predetermined time slot (301), and a different signaling is assigned to each mobile station (12) disposed in a radio cell of the base station (11), so that signaling operations of various mobile stations, transmitted via the at least predetermined time slot, can be distinguished from one another in the base station (11).

16 Claims, 2 Drawing Sheets

U.S. PATENT DOCUMENTS 6,757,293 B1 * 6/2004 Chuah et al. ............... 370/432
7,103,027 B2 * 9/2006 Dick et al. .................. 370/335

FOREIGN PATENT DOCUMENTS

EP          0 841 763 A1 *  5/1998
WO          01 17304 A       3/2001

OTHER PUBLICATIONS

TR 25.833 V1.0.0, Physical Layer Items Not for Inclusion in Release '99, pp. 1-19, 1999.*

TSGR1#3(99) 156, Summary of Joint Predistortion, pp. 1-4, Mar. 1999.*

Adachi F., et al: "Tree-Strustured Generation of Orthogonal Spreading Codes With . . . " Electronics Letters, IEE Stevenage, GB, BD. 33, NR. 1, Jan. 2, 1997, pp. 27-28.

Karol M et al: "Time-Frequency-Code Slicing: Efficiency . . . " IEEE Transactions on Vehicular Technology, IEEE Inc. New York, US. BD. 46, NR. 4, Nov. 1, 1997, pp. 818-826.

"Fast Uplink Signalling Mechanism for FDD and TDD Systems", TDOC SMG2 UMTS-LI 227/98, Philips Research Laboratories, 1998, pp. 1-8.

* cited by examiner

METHOD FOR TRANSMITTING SIGNALING

BACKGROUND OF THE INVENTION

The invention is based on a method for transmitting signaling.

Methods for transmitting signaling between a mobile station and a base station in a mobile radio network are already known, for instance from the publication entitled "Fast Uplink Signalling Mechanism for FDD and TDD systems", Tdoc SMG2 UMTS-L1 227/98, Philips Research Laboratories, 1998.

SUMMARY OF THE INVENTION

The method according to the invention having the characteristics of the main claim has the advantage over the prior art that the signaling is transmitted in at least one predetermined time slot, and a different signaling is assigned to each mobile station disposed in a radio cell of the base station, so that signaling operations of various mobile stations transmitted via the at least one predetermined time slot can be distinguished from one another in the base station. In this way, an unambiguous signaling can be achieved. It is as a rule therefore unnecessary to repeat the transmission of the signaling. Hence the signaling leads to the desired outcome especially quickly. This assures that the least possible use will be made of transmission resources. Signaling of a plurality of mobile stations is possible by using only a single joint time slot.

By the provisions recited in the dependent claims, advantageous refinements of and improvements to the method defined by the main claim are possible.

It is advantageous that each of the mobile stations is assigned its own signaling in the form of a different code. Especially in a mobile radio network based on code division multiple access with orthogonal codes, this makes it possible to achieve an umambiguous signaling, using the available codes, in a simple and efficient way without significantly claiming additional transmission resources.

Another advantage is that signaling received in the base station is correlated with all the codes assigned to the mobile stations, in order to ascertain the mobile station associated with the signaling received. In this way, the base station can unambiguously determine the mobile station that has transmitted the signaling.

It is especially advantageous that the mobile stations are each assigned a time lag by which a predetermined signaling sequence is transmitted in delayed fashion in the at least one predetermined time slot. This provides an alternative possibility of unambiguous, efficient signaling, in which only one time slot and one predetermined signaling sequence are required.

Another advantage is that the predetermined signaling sequence is transmitted in spread form by means of a predetermined code. In this way, transmission of the signaling can be achieved while claiming minimal transmission capacity, especially whenever the predetermined code is taken from a set of orthogonal codes, for instance for use in a code division multiple access system.

It is also advantageous that in the base station, on the basis of the amplitude course over time of the received predetermined signaling sequence, the time lag employed is detected in order to ascertain the assigned mobile station. In this way, the base station can unambiguously determine which mobile station sent the signaling.

Another advantage is that the signaling operations are transmitting with a power that is substantially lower than the power for transmitting useful data. In this way, the additional interference caused by the signaling is minimized.

It is also advantageous that at least one of the signaling operations is transmitted together with another signaling or with useful data of an already existing connection in the at least one predetermined time slot. This economizes on transmission capacity.

BRIEF DESCRIPTION OF THE DRAWINGS

Exemplary embodiments of the invention are shown in the drawing and explained in further detail in the ensuing description.

DETAILED DESCRIPTION OF THE PREFERRED EMBODIMENTS

Figure 1:
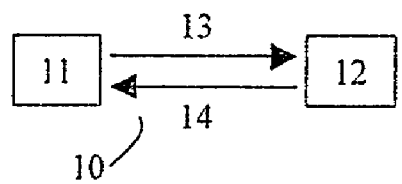
FIG. 1 shows a mobile radio network in simplified form.

In a mobile radio network 10, which can for instance be embodied by the GSM standard (Global System for Mobile Communication) or the UMTS standard (Universal Mobile Telecommunications System), not only the useful data, which are present for instance in the form of speech signals, but also signaling data, for instance for hand-over procedures or for setting up new channels must be transmitted both in a downlink transmission direction 13 from a stationary base station 11 to a mobile station 12 as in FIG. 1 but also in an uplink transmission direction 14 from the mobile station 12 to the base station 11. The invention will be described below in terms of a mobile radio network, as an example on the basis of a mobile radio network 10 by the UMTS standard, which will hereinafter be called a UMTS mobile radio network 10.

In the UMTS mobile radio network 10, two modes for transmission by way of the air interface are provided: In an FDD mode (Frequency Division Duplex), two different frequencies exist for the uplink transmission direction 14 and the downlink transmission direction 13. In a TDD mode (Time Division Duplex), only a single carrier frequency is used for both transmission directions, and by the allocation of time slots a separation between the downlink transmission direction 13 and the uplink transmission direction 14 is made.

The signals of various subscribers of the mobile radio network are separated from one another by spreading using orthogonal codes. In the TDD mode, the thus-spread signals of the various subscribers are transmitted within the same time slot.

It will be assumed as an example below that the UMTS mobile radio network 10, shown in simplified form in FIG. 1, is embodied by the TDD mode. FIG. 3 shows the layout of a transmission frame 30 used for the purpose. Each transmission frame, in this example, has a chronological length of 10 ms and comprises a total of fifteen time slots 301, 302, . . . , 315. A first time slot 301 is to be reserved for transmission in the uplink transmission direction 14, and a second time slot 303 is to be reserved for transmission in the downlink transmission direction 13. Within each of the time slots 301, 302, . . . , 315, precisely one so-called TDD burst 20 as in FIG. 2 can be transmitted. This burst comprises two data blocks 21, 23 for data transmission, a midamble block 22 for channel estimation, and a protective spacing 24.

Figure 4:
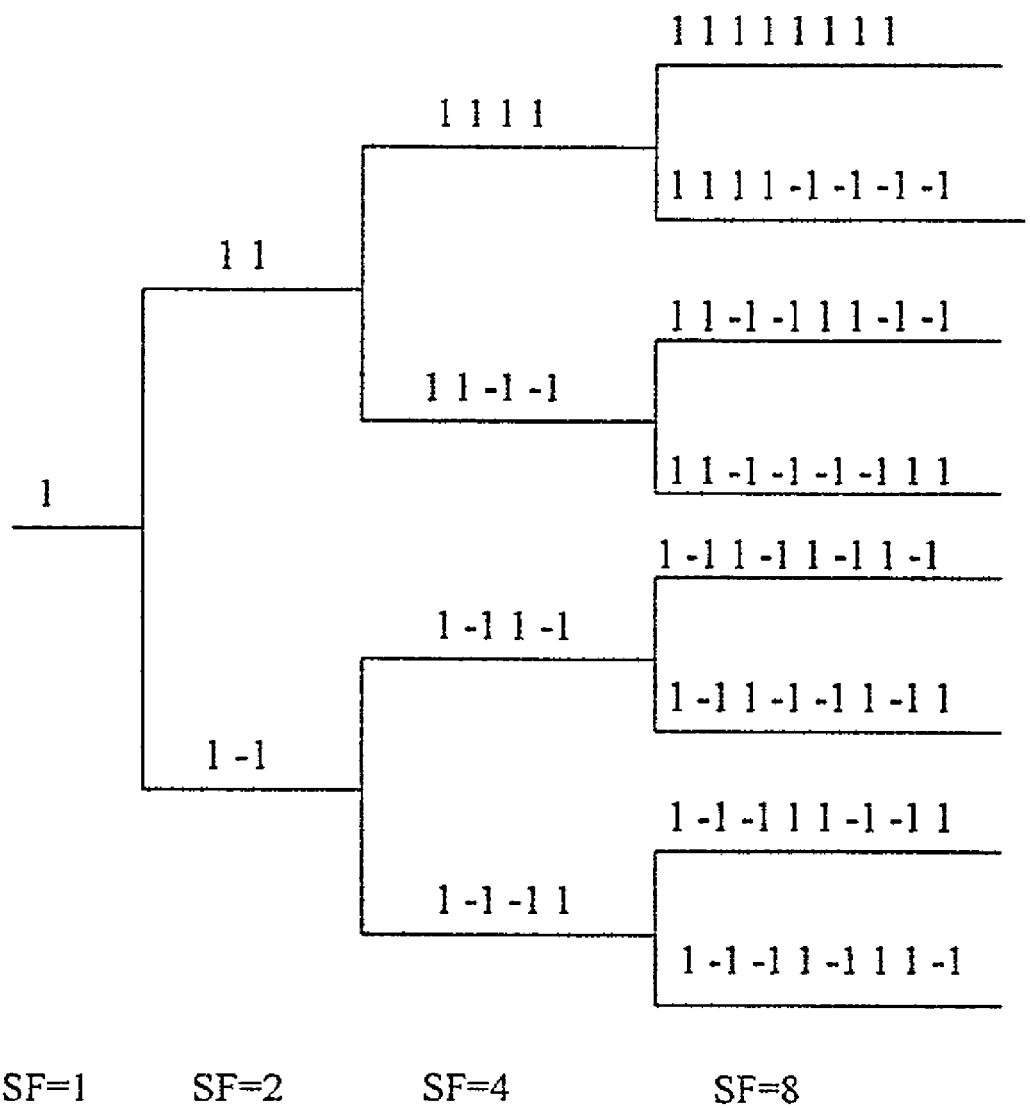
FIG. 4 shows a code tree for generating a code.

Within each of the time slots 301, 302, ..., 315, useful data from a maximum of sixteen subscribers can be transmitted, on the principles of a CDMA system (Code Division Multiple Access). To achieve this, the useful data to be transmitted from the various subscribers must be spread in the applicable time slot before being transmitted. In FIG. 4, a code tree is shown, with the aid of which so-called OVSF (Orthogonal Variable Spreading Factor) codes are created for spreading the useful data to be transmitted.

Along with the useful data, signaling operations are also transmitted between the mobile station 12 and the base station 11. These signaling operations can serve for instance to request a transmission channel, send a command for regulating the transmission power, or transmit a reference signal for a channel estimation. In all these cases named, a reaction to the signaling is to be brought about in the station that receives the signaling. This reaction, for the cases cited as examples, then comprises either the allocation of a transmission channel, the adjustment of the transmission power, or the estimation of the channel pulse response on the basis of the reference signal received, for instance for use for a predistortion by a JP (Joint Predistortion) process. Below, how such signaling operations are transmitted from the mobile station 12 to the base station 11 will be described, taking as an example signaling for requesting a transmission channel.

In a first exemplary embodiment, the signaling operations are generated from the OVSF codes described. The code tree shown in FIG. 4 illustrates the generation of the OVSF codes up to a spread factor SF=8. In the TDD of the UMTS mobile radio network 10, OVSF codes with spread factors SF$\in$\{1, 2,4,8,16\} are currently possible. With the aid of the OVSF codes, orthogonal code sequences can be generated, and an essential property is that codes of different length are also orthogonal to one another.

In this first exemplary embodiment, transmission of the signaling operations is meant to be possible only in the first time slot 301. Within the first time slot 301, all the signaling operations are generated from a certain, previously defined spreading code of length 16, where the spread factor SF is thus 16. For instance, the last spreading code with the spread factor SF=16 selected, which in FIG. 4, where the code tree is shown up to the spread factor SF=8, would be located at the lowermost point if continued appropriately. This lowermost branch of the code tree with the spread factor SF=16 is now expanded up to the spread factor or length of 256. Thus within the first time slot 301, a total of sixteen codes are available for the signaling. In other words, sixteen codes with a spread factor of 256 of the OVSF codes are used for the signaling.

Figure 2:
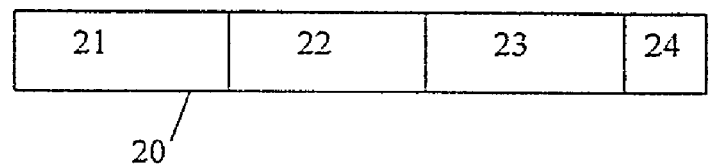
FIG. 2 shows the layout of a burst for a transmission in a time division duplex operating mode.
Figure 3:
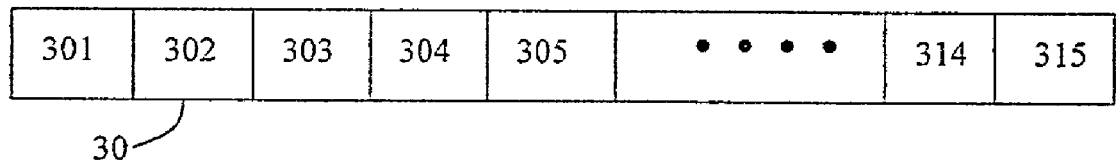
FIG. 3 shows the layout of a transmission frame in the time division duplex operating mode.

With these codes of length 256 for the signaling, only one signaling burst is now constructed, which has the same structure as the TDD burst 20 shown in FIG. 2. The code for the signaling is repeated within the data blocks 21, 23 until such time as these blocks are filled; the code for the signaling can be cut off at the last required repetition for filling up the data blocks 21, 23. In the first time slot 301, the midamble block 22 is also allocated to each such TDD burst 20 embodied as a signaling burst.

Among the codes described for signaling, the code that would be located at the very bottom in the code tree of FIG. 4, with the spread factor SF=256, is allocated or assigned to the mobile station 12, for instance at the time of check-in into the radio cell of the base station 11. It could additionally be agreed that the mobile station 12 has complete authority for signaling. Then mobile stations without authority for signaling are not allocated any codes for signaling. Each mobile station authorized for signaling is assigned a different code for signaling. If the mobile station 12 requires only one channel for useful data transmission in the uplink transmission direction 14, hereinafter called the uplink channel, then in the first time slot 301, it sends its allocated code for signaling in order to request such a channel, whereupon the base station 11 informs the mobile station 12 of the parameters for such an uplink channel in the second time slot 303. The allocated uplink channel can also be located in the first time slot 301, so that in the subsequent transmission frame 30 the mobile station 12 can likewise begin to transmit the useful data in the first time slot 301.

The transmission power of the signaling burst 20 is substantially below the transmission power of a normal burst for transmitting useful data. Thus the additional interference in the uplink transmission direction 14, caused by the use of the signaling burst 20, is minimal. Detecting the signaling code, received in the base station 11, and thus detecting the mobile station 12 assigned to this signaling, is done by correlation with the sixteen different predetermined codes for signaling. Alternatively, the signaling codes can be detected by a JD (Joint Detection) process.

In the event that the sixteen predetermined codes for signaling in the first time slot 301, as the sole time slot used for signaling per transmission frame 30, are too few, the transmission of the signaling could be expanded to additional time slots in the uplink transmission direction 14. It would also be conceivable to increase the number of predetermined codes for signaling, by using even higher spread factors than 256 in the code tree for generating these signaling codes. For instance, if an expansion to the spread factor SF=1024 is accomplished, a total of sixty-four codes for signaling are available.

In a second exemplary embodiment, the signaling can be performed in still another way. In the first exemplary embodiment, the OVSF codes are used directly as codes for signaling. In the second exemplary embodiment, although once again a specific OVSF code with the spread factor SF=16 is now to be reserved again for the signaling, for instance the lowermost code in the code tree having the spread factor SF=16. However, this code is used for spreading a signaling sequence that is predetermined for all the mobile stations in the radio cell of the base station 11 that are authorized for the signaling. This signaling sequence is a fixed symbol sequence, identical for all the mobile stations authorized for signaling in the radio cell of the base station 11, with good autocorrelation properties. The signaling sequence is spread with the OVSF code predetermined or reserved for the purpose and is transmitted in the data blocks 21 and 23 of the signaling burst 20. The signaling sequence should comprise enough symbols that, being spread with the spread factor SF=16, it lasts precisely as long as the two data blocks 21 and 23 together. Each mobile station that uses this signaling sequence is allocated a different time lag for starting the signaling sequence. The mobile station 12 begins with the start of the signaling sequence exactly at the time of the start of the signaling burst 20, shown in FIG. 2 and used for the signaling. A second mobile station, not shown, in the radio cell of the base station 11 begins with its start of the signaling sequence four symbols later, for instance. This is equivalent to a time lag of sixty-four chips. Since the signaling sequence however contains four symbols more than can be transmitted, beginning with the aforementioned time lag, in the data blocks 21, 23, the remaining four symbols are transmitted at the beginning of the signaling burst 20. The signaling sequence is accordingly transmitted, cyclically delayed, for different mobile stations, and each time lag unambiguously identifies the mobile station 12 associated with this time lag. The time lag for the various mobile stations comprises multiples of four symbols, that is, multiples of sixty-four chips after spreading by the spread factor SF=16. This value of four symbols is equivalent to a maximum incident length of the transmission channel of sixty-four chips. The result is thirty possible different time lags, or thirty different mobile stations, per time slot used for the signaling in the uplink transmission direction 14. The cyclically delayed signaling sequence is then further spread with the predetermined OVSF code described, so that the orthogonality relative to the other signals transmitted in the same time slot will be assured. Once again, each signaling burst 20 is allocated its own midamble block 22.

The transmission power of this signaling burst 20 is once again very low in comparison with useful data bursts. The detection of the signaling bursts 20 received in the base station 11 is effected after the unspreading, for instance by means of a matched filter with peak detection. Depending on the point in time in the amplitude course of the received and unspread signaling burst 20 when a maximum value occurs, a conclusion can be drawn as the fundamental time lag and the transmitting mobile station associated with it, and accordingly the construction of an uplink channel requested by the signaling can be initiated. The unspreading of the signaling burst can also be performed a JD process.

In both exemplary embodiments, the signaling can be detected especially quickly, if the transmission quality allows this: If the detection quality within the first data block 21 is already sufficient to make a reliable decision, then the evaluation of the second data block 23 can be dispensed with.

In a further embodiment, it can additionally be provided that the spread signaling sequence be transmitted in only one of the two data blocks 21, 23. To that end, in comparison with the embodiment described above, the signaling sequence is divided in half in terms of its length. Thus the various mobile stations can additionally be distinguished from one another in the base station 11 according to which of the two data blocks 21, 23 the signaling sequence was transmitted in and was received in the base station 11.

Because of the rigid dividing up of the time slots to the different transmission directions, namely the downlink transmission direction 13 or the uplink transmission direction 14, the advantage of fast signaling, for instance in the uplink transmission direction 14, can under some circumstances be limited, especially if only one time slot in the uplink transmission direction 14 per transmission frame 30 is allocated.

This can be counteracted by providing that the transmission of the signaling, in the first or second exemplary embodiment, in the uplink transmission direction 14 is also made possible by using a time slot in the downlink transmission direction 13. In general, the signaling can be transmitted together with another signaling or with useful data of an already existing connection, within a joint time slot.

Because of the low transmission power provided for transmitting the signaling burst 20, only slight additional interference need be expected. However, both in the first and the second exemplary embodiment, it must be assured that the spreading code reserved for transmitting the signaling, having the spread factor SF=16, not be used in the downlink transmission direction 13.

The use of a joint time slot for signaling as described forms its own signaling channel, which is also known as a FAUSCH (Fast Uplink Signaling CHannel) for the uplink transmission direction 14. Although with the FAUSCH a new channel is introduced in the uplink transmission direction 14, still the required changes in the mobile station 12 and the base station 11 are only slight.

An advantage of the method of the invention is the capability of the mobile station 12, in the TDD mode, of transmitting a 1-bit signaling, for instance, without a time lag in the intended or predetermined joint first time slot 301 to the base station 11; in the base station 11, the signaling then leads to a previously defined reaction and at the same time does not represent any significant worsening of other channels.

The invention claimed is:

1. A method for transmitting signaling from a mobile station to a base station in a mobile radio network, comprising the following steps:
    transmitting the signaling in a common, predetermined time slot shared by a plurality of mobile stations;
    assigning each mobile station disposed in a radio cell of the base station a different signaling in the form of a different code, so that signaling operations of various mobile stations transmitted via the at least one predetermined time slot are distinguished from one another in the base station.

2. The method of claim 1, wherein each of the mobile stations (12) is assigned its own signaling in the form of a different code.

3. The method of claim 2, wherein on the basis of a predetermined spreading code of predetermined length, the different signaling operations are generated in that the predetermined spreading code is expanded in its length in order to branch out into a plurality of codes, in particular orthogonal codes.

4. The method of claim 3, wherein a signaling received in the base station (11) is correlated with all the codes assigned to the mobile stations, in order to ascertain the mobile station associated with the signaling received.

5. The method of claim 1, wherein with the signaling, a reference signal for a channel estimation is transmitted.

6. The method of claim 1, wherein the predetermined signaling sequence is transmitted in spread form by means of a predetermined code.

7. The method of claim 1, wherein in the base station, on the basis of the amplitude course over time of the received predetermined signaling sequence, the time lag employed is detected in order to ascertain the assigned mobile station.

8. The method of claim 6, wherein the spread signaling sequence is transmitted in only one of two data blocks (21, 23) of a burst (20) disposed in the at least one predetermined time slot (301).

9. The method of claim 8, wherein in the base station (11), the particular one of the two data blocks (21, 23) in which the signaling sequence has been transmitted is detected, in order to ascertain the assigned mobile station.

10. The method of claim 1, wherein the signaling operations are transmitting with a power that is substantially lower than the power for transmitting useful data.

11. The method of claim 1, wherein at least one of the signaling operations is transmitted together with another signaling or with useful data of an already existing connection in the at least one predetermined time slot (301).

12. The method of claim 1, wherein the mobile radio network is operated by a CDMA-TDD process (CDMA=Code Division Multiple Access; TDD=Time Division Duplex), using orthogonal codes.

13. The method of claim 1, wherein with the signaling, a request for a transmission channel for setting up a connection between the mobile station (12) and the base station (11) is transmitted.

14. The method of claim 1, wherein with the signaling, a command for regulating the transmission power is transmitted.

15. A method for transmitting signaling from a mobile station to a base station in a mobile radio network, comprising the following steps:
- transmitting the signaling in at least one predetermined time slot shared by a plurality of mobile stations;
- assigning each mobile station disposed in a radio cell of the base station a different signaling, wherein the mobile stations are each assigned a time lag;
- transmitting a predetermined signaling sequence in delayed fashion according to the time lag in the at least one predetermined time slot, so that signaling operations of various mobile stations transmitted via the at least one predetermined time slot are distinguished form one another in the base station.

16. A method for transmitting signaling from a mobile station to a base station in a mobile radio network, comprising the following steps:
- transmitting the signaling in at least one predetermined time slot shared by a plurality of mobile stations;
- assigning each mobile station disposed in a radio cell of the base station a different signaling, wherein the mobile stations are each assigned a time lag;
- transmitting cyclically delayed a predetermined signaling sequence in the at least one predetermined time slot, whereby the symbols of the signaling sequence that is be transmitted in the at least one predetermined time slot, beginning with said time lag, a beginning of the at least one predetermined time slot, so that signaling operations of various mobile stations transmitted via the at least one predetermined time slot are distinguished from one another in the base station.

* * * * *